Patented July 27, 1926.

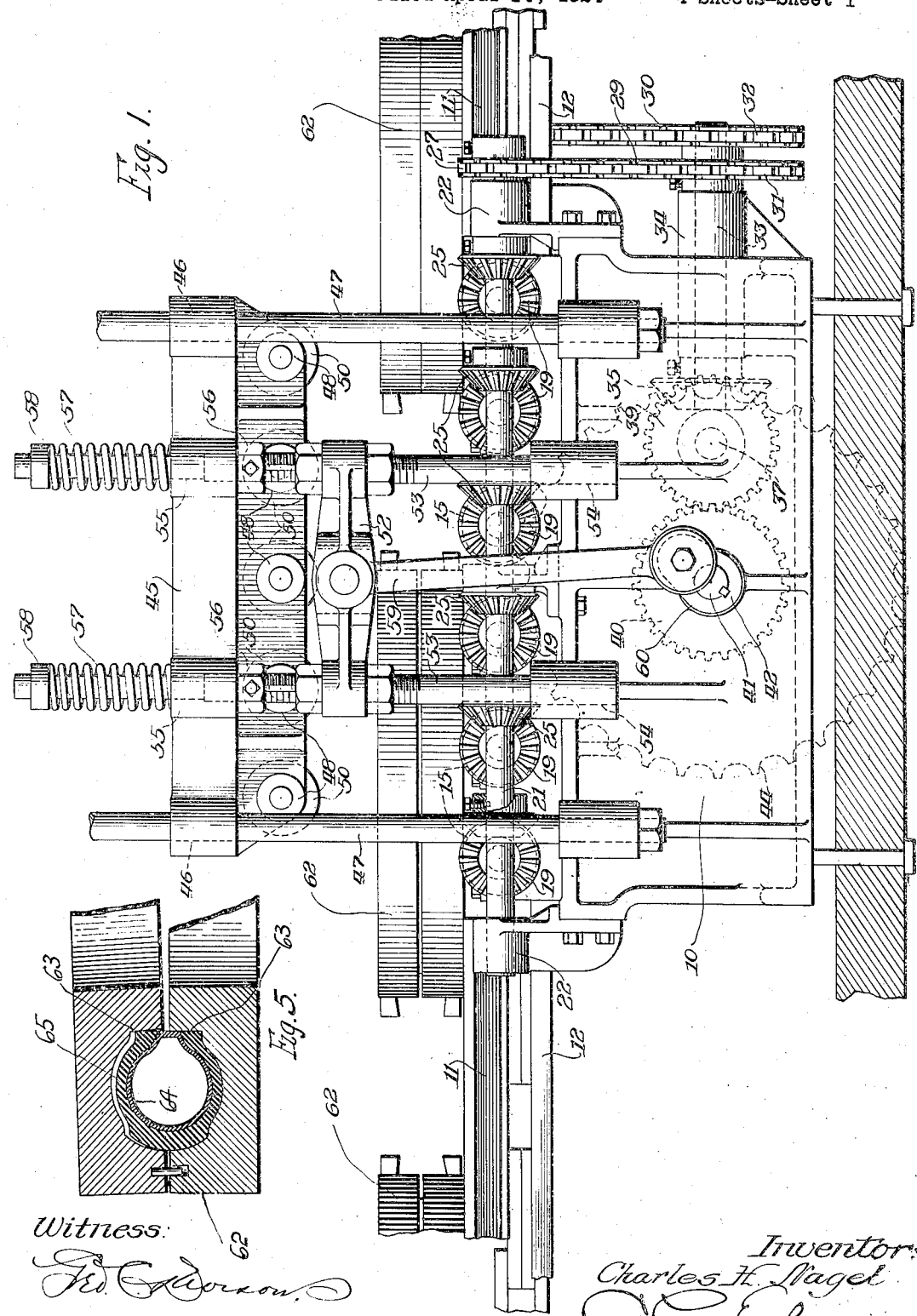

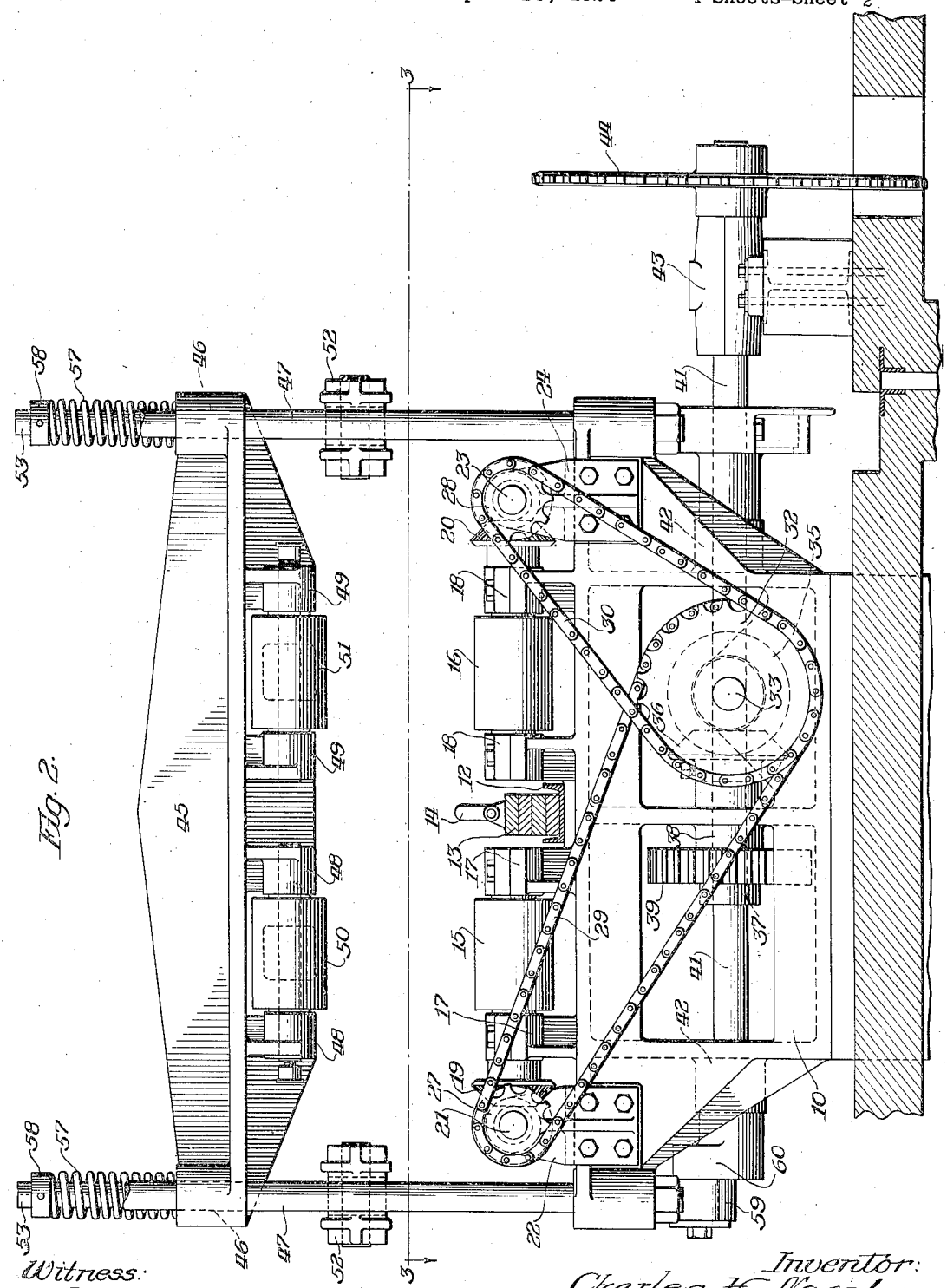

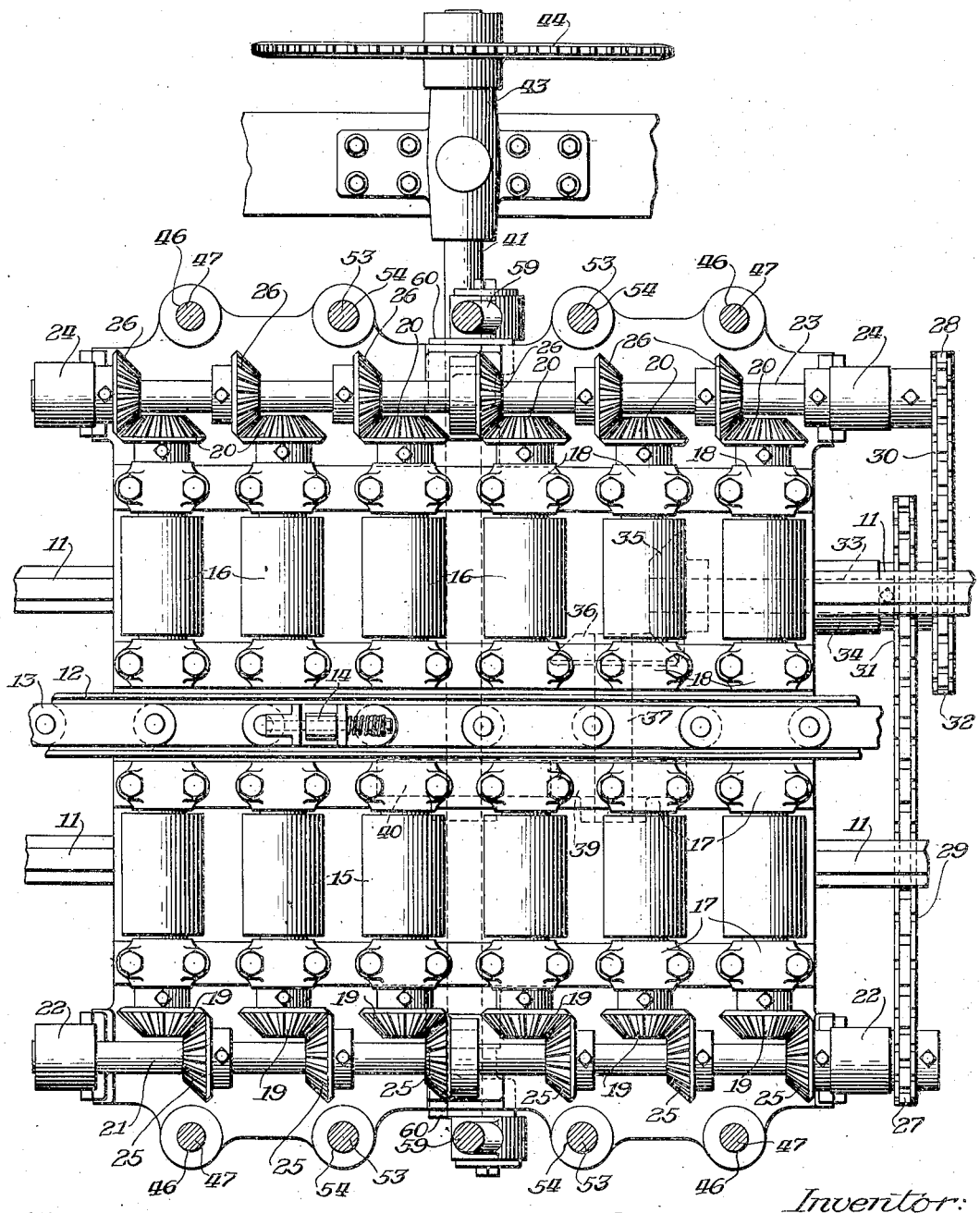

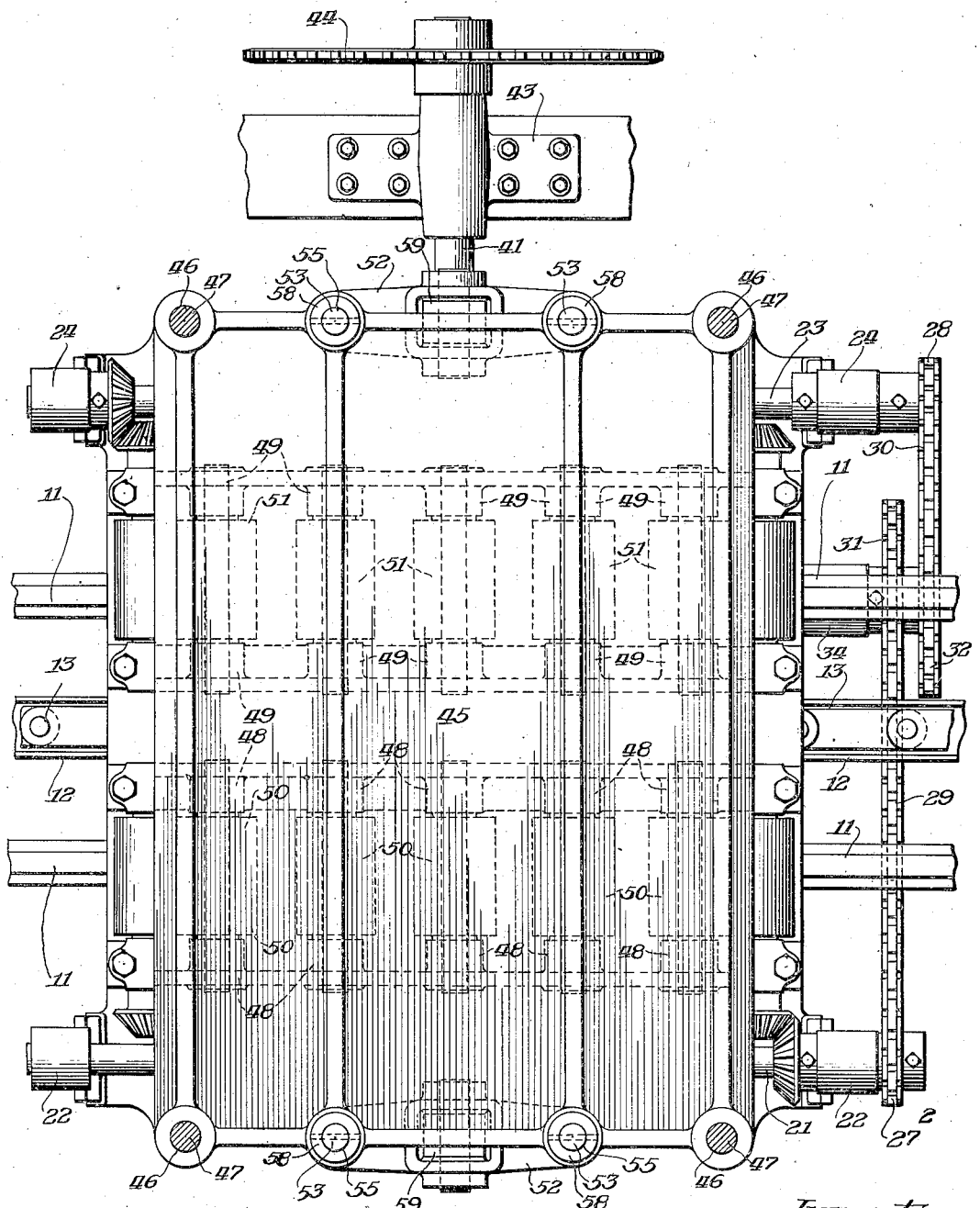

1,593,878

UNITED STATES PATENT OFFICE.

CHARLES H. NAGEL, OF BARBERTON, OHIO, ASSIGNOR TO THE FIRESTONE TIRE AND RUBBER COMPANY, OF AKRON, OHIO, A CORPORATION OF OHIO.

MOLD PRESS.

Application filed April 14, 1924. Serial No. 706,243.

This invention relates to mold presses and especially to a press adapted to close molds having two or more parts, the latter being conveyed to and from the press, the press of the invention being adapted particularly to the closing of tire-molds before being conveyed to heaters wherein tires contained in the molds are to be vulcanized.

In the manufacture of tires, the casings are built of rubberized fabric and rubber and are mounted on either rigid or expansible cores, bead clamping or "bull" rings having heretofore been used in the latter case, and the cores carrying the tires are inserted in molds, usually two-part annular molds. The molds are then stacked in a heater press or autoclave and subjected to pressure and to the application of steam, hot water, etc., to their external surfaces. In pressing a stack of molds, it frequently occurs that some of the molds are not properly closed, thus causing the formation of imperfect tires.

In modern rubber plants, the molds are carried to the heaters by various conveyor systems and it is the general purpose of this invention to provide a press adapted to operate on molds carried by conveyors while they are on the conveyors and before they reach the heaters whereby the molds will be securely closed before insertion into the heaters. This preliminary closing of the molds on cord tires having air bags therein is of special advantage in that use of separate bead molding rings may be dispensed with the tire molds may be formed with integral bead molding portions, which heretofore has been impractical owing to the difficulty in forcing tires with inextensible beads into such molds.

A particular object of the invention is to provide a press and conveyor in combination, whereby the press will operate upon molds spaced on the conveyor. More specifically, the invention contemplates the continuous operation of a conveyor carrying molds and a press adapted to operate upon the continuously traveling molds.

An important object of the invention is to provide a press having means in combination therewith for driving the molds between the press member and particularly to drive the molds at such speed as compared with that of the conveyor that mold engaging devices on the conveyor will be relieved of strains due to the pressure on the molds in the press.

Other objects will appear from the following detailed description of the invention in connection with the accompanying drawings in which the same is illustrated in its preferred form, it being understood that the invention is not limited to the specific device shown and described, nor would all of the benefits of the invention be sacrificed in modifying the structure shown for purposes of general application.

Of the accompanying drawings:

Figure 1 is a side elevation of a press embodying my invention;

Figure 2 is a right end elevation thereof;

Figure 3 is a section on line 3—3 of Figure 2;

Figure 4 is a plan of the press; and

Figure 5 is a section showing a tire mold containing a cord tire on an expansible bag.

Referring to the drawings, 10 represents a suitable supporting frame adapted to be inserted in an opening of suitable size provided in a tire mold conveyor line 11 at a position therein in advance of heater presses (not shown), the frame being adapted to support a portion of a conveyor chain track or channel 12 which extends through the press whereby a chain 13 having mold engaging lugs 14, 14 thereon is adapted to carry molds to and from the press. It is to be understood that the chain 13 is continuously driven in any suitable manner (not shown), to carry molds over the conveyor 11 to the various stations prior or subsequent to the mold pressing station illustrated.

The lower press platen comprises sets of longitudinally spaced rollers 15, 15 and 16, 16 disposed in aligned pairs, one on each side of the channel 12, so spaced as to support an annular tire mold 62, Figures 1 and 5, in proper position to be pressed. The rollers 15 are journaled in brackets 17, 17 and the rollers 16 in brackets 18, 18 mounted on the frame 10 and preferably are adapted to be power driven at such speed as to advance a mold through the press faster than the conveyor chain 13 travels therethrough by bevel gears 19, 19 and 20, 20 secured respectively on the trunnions on the outer ends of rollers 15 and on the trunnions on the outer ends of rollers 16. For driving gears 19, a shaft 21 is journaled in brackets 22, 22 so mounted on the frame 10 that the shaft 21 will extend longitudinally of the press adjacent the outer side thereof; and for driving gears 20, a shaft 23 is journaled in brackets 24, 24 so mounted on the frame 10 that shaft 23 will extend longitudinally of the press adjacent the inner side thereof. Bevel gears 25, 25 secured on shaft 21 are meshed with gears 19 and bevel gears 26, 26 secured on shaft 23 are meshed with gears 20.

In order that the rollers 15 and 16 will be peripherally driven at a higher rate than the chain 13, the shafts 21 and 23 are preferably driven from the same source of power (not shown) as the chain 13 is driven. To this end sprockets 27 and 28 are secured, respectively, on the right ends of shafts 21 and 23 and respectively have trained thereover chains 29 and 30 which are respectively driven by sprockets 31 and 32 secured on a shaft 33 journaled in a bearing 34 in frame 10. The shaft 33 is adapted to be driven by a bevel gear 35 which is in mesh with a bevel gear 36 on a shaft 37 journaled in a bearing 38 in frame 10 and driven by a gear 39 meshing with a gear 40 on a drive shaft 41 which is journaled in bearings 42, 42 in frame 10 and in a bearing bracket 43 mounted inwardly of the press frame 10 on the floor of the building in which the press is installed. The shaft 41 is adapted to be driven by a sprocket 44 secured thereon and driven by a chain (not shown) from the same source of power as that of the conveyor drive (not shown).

The upper platen of the press comprises a plate casting 45 formed with vertical apertures 46, 46 adjacent its four corners adapted to slidably mount the plate 45 on vertical posts 47, 47 bolted onto the frame 10 adjacent the four corners of the latter. The plate 45 has secured on its under surface sets of brackets 48, 48 and 49, 49 in which are journaled sets of rollers 50, 50 and 51, 51 arranged in aligned pairs in the same order as rollers 15 and 16, the rollers 50 and 51, however, being so spaced longitudinally of the press that their axes are offset from, or positioned over the spaces between the rollers 15 and 16.

For operating the upper platen of the press toward and from the lower platen thereof, reciprocating cross-heads or yokes 52, 52 respectively on the outer sides of the press are adjustably connected to rods 53, 53 reciprocably mounted in vertical apertures or bores 54, 54 formed in the frame 10, the rods 53 extending through bores 55, 55 in the plate 45 and being yieldingly secured to the plate 45 by nuts 56, 56 on the rods 53 screwed into engagement with the under side of the plate 45 against the action of coil springs 57, 57 encircling the rods 53 above the plate 45 and compressed between the plate 45 and collars 58, 58 on the upper ends of the rods 53.

Reciprocation of the cross-heads 52 is effected by connecting rods or pitmans 59, 59 connected to cranks 60, 60 secured on drive shaft 41 adjacent the outer and inner ends thereof.

In operation, the conveyor chain is continuously driven, thus carrying tire molds, indicated at 62, onto the lower platen rolls 15 and 16 which, because of their speed of rotation, carry the molds in advance of the dogs or the lugs 14 to relieve them from great strains during the pressing action. The reciprocation of the upper platen 45 as compared with the speed of the chain 13 is such that when a mold has advanced to adjacent the center of the press the platen rollers 50 and 51 engage and press the mold against the lower platen rolls 15 and 16, the rollers 15 and 16 all the while driving the mold forward and the rollers 50 and 51 idling to permit such travel. When the pressing action is completed, the mold is advanced out of the press by the rollers 15 and 16, the dog 14 on the chain 13 catches up to and engages the tire mold to continue it on its travel on the conveyor 10 to the heaters (not shown) and another mold is carried into the press, as described.

In using the above described apparatus for vulcanizing cord tires, the molds 62 are designed as shown in Figure 5 with integral bead molding portions 63, 63, an expansible bag 64 being inserted in the tire 65 before inserting the latter in the mold.

Modifications of the invention may be resorted to without departing from the spirit or scope thereof as claimed in the appended claims. For example, the operation of the conveyor may, for some purposes, be made intermittent, thus to dispense with the use of rollers on the press platens, or the upper platen may be held stationary and the lower platen reciprocated, or both platens may be reciprocated, or the press may be operated by hydraulic or other devices as found expedient.

I claim:

1. Apparatus for the manufacture of tires, said apparatus comprising, in combination, a tire-mold conveyor and a fixed press having relatively movable platens adapted to close tire-molds while traveling on the conveyor.

2. Apparatus for the manufacture of tires, said apparatus comprising, in combination, a tire-mold conveyor and a fixed press comprising relatively movable platens operable upon tire molds while continuously carried to and from said press by said conveyor.

3. Apparatus for the manufacture of tires comprising, in combination, a tire-mold conveyor and a fixed press having relatively movable platens adapted to cooperate with continuously traveling tire-molds to close the same.

4. Apparatus for the manufacture of tires comprising, in combination, a tire-mold conveyor, and a fixed reciprocating press, said conveyor being adapted to travel between the platens of said press, said press being adapted to close the molds while traveling.

5. Apparatus of the class described comprising, in combination, a mold conveyor and a fixed press, said conveyor being adapted to travel between the platens of said press, said press being adapted to close the molds while traveling.

6. Apparatus of the class described comprising, in combination, a conveyor adapted continuously to carry molds to and from a press, and means adapted to cause a mold in the press to travel at a rate greater than that of the conveyor.

7. Apparatus of the class described comprising, in combination, a press, a conveyor adapted to carry a mold through the press, and means adapted to disengage a mold in the press from the conveyor.

8. Apparatus for the manufacture of tires comprising, in combination, a tire mold conveyor adapted to travel through a press and means adapted to cause a mold in the press to travel at a rate greater than that of the conveyor.

9. Apparatus of the class described comprising, in combination, a mold-conveyor chain extending through a press and rollers on a platen of said press adapted to engage and drive a mold in the press at a faster rate than said chain.

10. A mold-press comprising relatively movable platens and rollers journaled on said platens.

11. A press comprising relatively movable platens and rollers journaled on said platens certain of said rollers being driven.

12. A press comprising a lower stationary platen and an upper reciprocable platen, rollers on each of said platens, and means for driving the rollers on the lower platen.

13. Apparatus of the class described comprising a conveyor adapted to be continuously driven, a press adapted to have said conveyor driven there-through, means on said conveyor for engaging molds to advance them through said press, and means on said press for engaging said molds and carrying them in advance of the mold-engaging means on said conveyor while the molds are being pressed in said press.

14. Apparatus of the class described comprising a conveyor for molds, a press having a platen alined with said conveyor, means for advancing the molds on the conveyor, and means on said platen for advancing molds through the press.

15. Apparatus of the class described comprising a conveyor for molds, a press having a platen alined with said conveyor, means for advancing the molds on the conveyor, means on said platen for advancing molds through the press, said means comprising a series of power driven rollers.

16. Apparatus of the class described comprising a fixed press having relatively movable platens, one of said platens being adapted to permit a conveyor to pass through said press, and means for supporting a mold in said press, said press being adapted to exert a pressing action on molds while moved therethrough by said conveyor.

17. Apparatus of the class described comprising a press having relatively movable platens, a track on one of said platens on which a conveyor is adapted to run, and rollers on both sides of the track for supporting a mold on said platen.

18. Apparatus of the class described comprising a press having relatively movable platens, one of said platens being adapted to permit the passage of a conveyor through said press, means on said conveyor for advancing a mold through said press, and means on said platen for advancing a mold through the press.

19. Apparatus of the class described comprising a press having relatively movable platens, one of said platens being adapted to permit the passage of a conveyor through said press, means on said conveyor for advancing a mold through said press, and means on said platen for advancing a mold through the press, said last named means being adapted to render said first named means inoperative on a mold during a pressing action.

20. Apparatus of the class described comprising, in combination, a press and a conveyor adapted continuously to carry molds to and from said press, and rollers on the press platens to permit travel of the molds while being pressed.

21. Apparatus of the class described comprising, in combination, a press and a conveyor adapted continuously to carry molds to and from said press rollers on the press platens to permit travel of the molds while being pressed, and means for permitting the platens to yield relatively apart while a mold is being pressed.

CHARLES H. NAGEL.